UNITED STATES PATENT OFFICE.

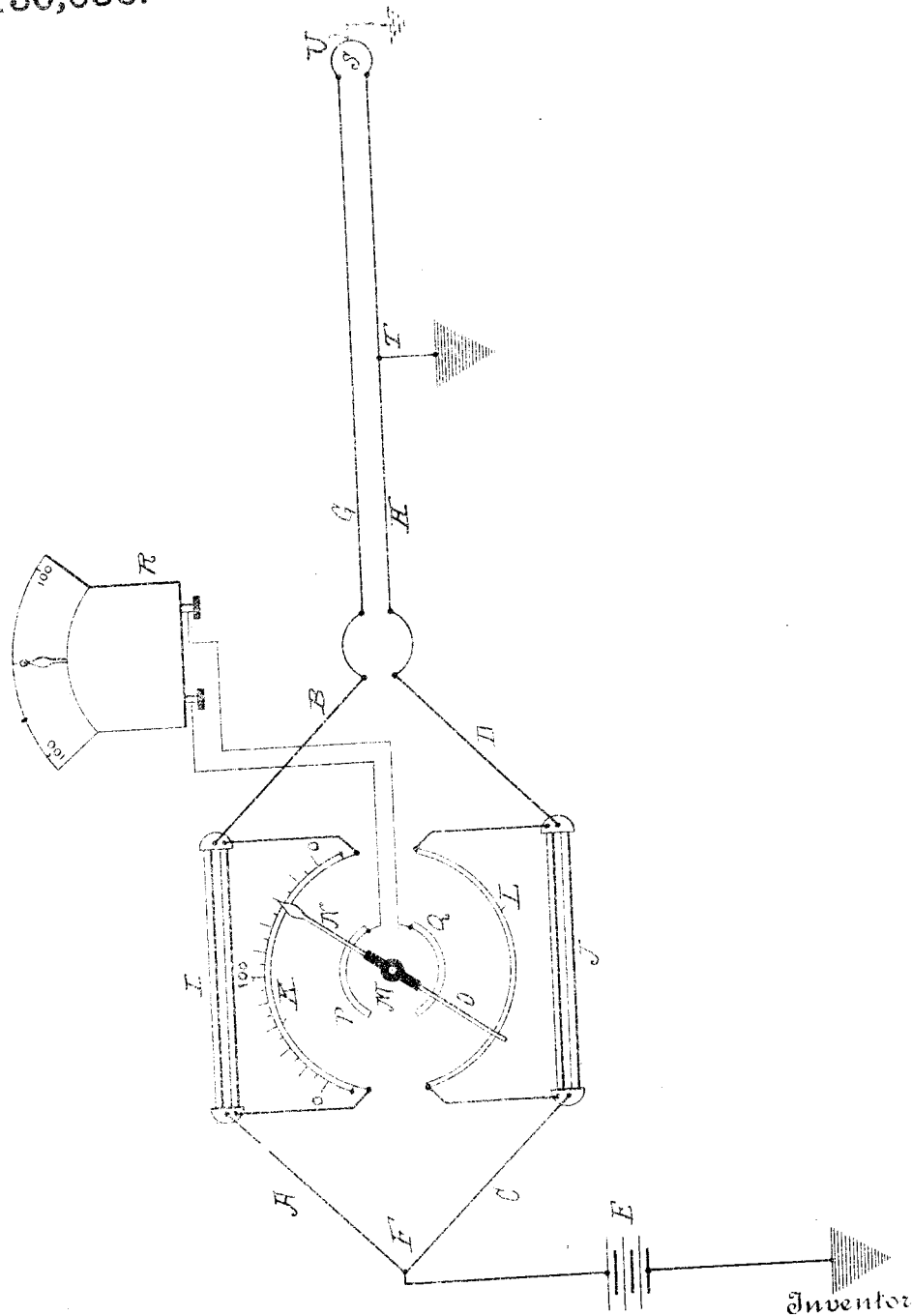

SEVERN D. SPRONG, OF BROOKLYN, NEW YORK, ASSIGNOR OF ONE-THIRD TO FRANK W. SMITH AND ONE-THIRD TO WALTER E. McCOY, BOTH OF NEW YORK, N. Y.

DEVICE FOR LOCATING FAULTS IN LINE-CONDUCTOR INSULATION.

1,130,036.

Specification of Letters Patent.

Patented Mar. 2, 1915.

Application filed March 26, 1914. Serial No. 827,830.

*To all whom it may concern:*

Be it known that I, SEVERN D. SPRONG, a citizen of the United States, residing at Brooklyn, in the county of Kings and State of New York, have invented a certain new and useful Improvement in Devices for Locating Faults in Line-Conductor Insulation, of which the following is a specification.

The invention is a device for locating faults in line conductor insulation. In present devices for this purpose depending on the Wheatstone bridge principle, the arms of the bridge are formed of the main conductors, and the adjustment of contacts on said arms introduces resistance variations which affect accuracy of determination. My device avoids this difficulty, allows of the location of the fault without calculation by the user, and is independent of variation and extent of current on the line.

The accompanying drawing is an electrical diagram wherein the various elements are shown symbolically.

A, B, C, D are bridge arms of suitable conductance for the normal line current. The testing battery E, grounded at one pole, is connected at its other pole to the junction point F of arms A, C. The terminals of a two conductor line G, H are connected respectively to arms B, D. Between the arms A, B and C, D are interposed low resistance shunts I, J. A shunt K of very high resistance relatively to shunt I is connected to the ends of shunt I, and a similar high resistance shunt L is connected to the ends of shunt J. The shunts K, L are in the shape of arcs struck from the center of a pivoted hub M of insulating material which carries and mutually insulates the contact arms N, O diametrically disposed with reference to the circle including shunts K, L and coöperating with said shunts. Arms N, O also make contact with arc-shaped conducting bars P, Q struck from the same center, which bars are connected to a millivoltmeter R. The shunt K has adjacent to it or inscribed upon it a scale graduated in equal units from 100 at the middle to zero at each end. The voltmeter scale is graduated in equal units from zero at the middle to 100 at each end. Since the proportion of the current which traverses K, L is very small, it will be observed that by this arrangement I have provided a phantom bridge, composed of the high resistance shunts K, L and the contact arms N, O, to which the millivoltmeter is connected.

Assume the line conductors G, H to be connected at their distant ends at S, and this connection to be grounded at its middle point U, (as shown in dotted lines) and the arm N to be placed at 100 on the scale of shunt K, the opposite arm O being in corresponding position on shunt L. The drop in potential from F to U will be the same in current path F, A, K, B, G, S, U as in current path F, C, L, D, H, S, U, and if we conceive these two paths to be divided into an equal number of equal units of length, then the drop in potential for each unit will be the same: so also for equal fractions of the lengths of these paths—as, for example, the shunts I, J, and so also for the derived phantom bridge shunts K, L. Hence the millivoltmeter connected to shunts K, L will indicate zero.

Assume now the ground to be removed from point U and applied to point T on conductor H, and that this new position of the ground constitutes the fault to be located. Two unequal paths for the current will be formed, namely, from point F by way of I, B, G, S to T, hereafter called for brevity path 1, and from point F by way of J, D, H to T, hereafter called path 2. The drop in potential from F to T in both paths is the same, but the drop per unit of length in the two paths is not the same. If, for illustration, path 1 were twice as long as path 2, then the drop over one unit of length on path 2 would equal the drop over two units of length on path 1. Obviously in such case the neutral position for the contact arms N, O on shunts K, L will no longer be at 100, and the voltmeter will show a deflection, so long as the contact arm N is left at the 100 mark. In order to restore neutrality, it will be necessary to move the contact arm N to such a position as that the distance on shunt K from the zero point on the left of the scale shall be greater than the distance from said zero point to 100 on the scale, thus increasing the length of that shunt in the voltmeter circuit, and at the same time by the movement of arm O on shunt L decreasing correspondingly the length of said shunt in said circuit. When the voltmeter needle comes back to zero, the length of shunt K included in the voltmeter circuit, measured from the zero point on the left to the point of adjustment of arm N on the scale, will bear the same ratio to path 1 as the length of shunt L from the point of adjustment of arm O to the left hand end of the shunt bears to path 2. Hence the scale reading on shunt K locates the fault, and, as shown in the drawing, in terms of percentage of the total length of the connected conductors G, H. Thus the reading of the conditions indicated on the drawing is that the fault is located on line conductor H—represented by the right hand portion of the scale on shunt K from 100 to 0—and at a point distant 60 per cent. of the length of said conductor measured from point F.

In every day use of this device, it is only necessary to make the connections as shown, apply a direct current of any suitable quantity and which also may be variable, and then adjust the contacts N, O by turning hub M until the voltmeter reads zero. I find by actual use that the results are sufficiently accurate for all practical purposes.

I claim:

1. A device for locating faults in a two conductor line, comprising a Wheatstone bridge having arms A, B, C, D, two of said arms, B, D, being respectively connected to said line conductors, a testing battery having one pole grounded and the other pole connected to the junction of arms A, C, two conductors I, J of definite resistance connected across the joints between arms A, B and arms C, D, two conductors K, L of relatively high resistance as compared with conductors I, J connected in shunt therewith and across said joints, a pivoted support, mutually insulated contact arms on said support, and a voltmeter connected to corresponding ends of said high resistance conductors: the said high resistance conductors being of arc-shape and coöperating with said contact arms.

2. A device for locating faults in a two conductor line, comprising a Wheatstone bridge having arms A, B, C, D, two of said arms, B, D, being respectively connected to said line conductors, a testing battery having one pole grounded and the other pole connected to the junction of arms A, C, two conductors I, J of definite resistance connected across the joints between arms A, B and arms C, D, two conductors K, L of relatively high resistance as compared with conductors I, J connected in shunt therewith and across said joints, mutually insulated contact arms coöperating respectively with said high resistance conductors, and a potential indicating device connected to said arms.

In testimony whereof I have affixed my signature in presence of two witnesses.

SEVERN D. SPRONG.

Witnesses:
 GERTRUDE P. PORTER,
 MAY T. McGARRY.